United States Patent
Duan et al.

(10) Patent No.: US 9,317,577 B2
(45) Date of Patent: Apr. 19, 2016

(54) METHOD AND SYSTEM FOR DATABASE PARTITION

(75) Inventors: Ning Duan, Beijing (CN); Bo Gao, Beijing (CN); Chang Jie Guo, Beijing (CN); Jian Ming Zhang, Beijing (CN)

(73) Assignee: International Business Macines Corporation, Armonk, NY (US)

( * ) Notice: Subject to any disclaimer, the term of this patent is extended or adjusted under 35 U.S.C. 154(b) by 812 days.

(21) Appl. No.: 12/770,114

(22) Filed: Apr. 29, 2010

(65) Prior Publication Data

US 2010/0281027 A1    Nov. 4, 2010

(30) Foreign Application Priority Data

Apr. 30, 2009   (CN) .......................... 2009 1 0136968

(51) Int. Cl.
    *G06F 17/30* (2006.01)
(52) U.S. Cl.
    CPC ................................ *G06F 17/30584* (2013.01)
(58) Field of Classification Search
    None
    See application file for complete search history.

(56) References Cited

U.S. PATENT DOCUMENTS

| | | | |
|---|---|---|---|
| 6,014,656 A * | 1/2000 | Hallmark et al. | |
| 6,023,710 A | 2/2000 | Steiner et al. | |
| 6,587,854 B1 * | 7/2003 | Guthrie | G06F 17/30471 707/1 |
| 7,469,253 B2 * | 12/2008 | Celis et al. | |
| 2004/0103084 A1 | 5/2004 | Megerian | |
| 2006/0085465 A1 * | 4/2006 | Nori | G06F 17/30297 707/1 |
| 2006/0206507 A1 * | 9/2006 | Dahbour | 707/100 |
| 2007/0033430 A1 | 2/2007 | Itkis et al. | |
| 2008/0077558 A1 | 3/2008 | Lawrence et al. | |
| 2008/0275858 A1 | 11/2008 | Day et al. | |
| 2009/0012932 A1 * | 1/2009 | Romem et al. | 707/2 |
| 2010/0030995 A1 * | 2/2010 | Wang et al. | 711/173 |

FOREIGN PATENT DOCUMENTS

| | | |
|---|---|---|
| CN | 101145158 A | 3/2008 |
| EP | 1401181 A1 | 3/2004 |

* cited by examiner

*Primary Examiner* — Son T Hoang
(74) *Attorney, Agent, or Firm* — Fleit Gibbons Gutman Bongini & Bianco PL; Thomas Grzesik (57) ABSTRACT

The present invention provides a flexible, dynamic database partition method and system. The method includes the steps of acquiring a data partition rule, where the data partition rule is used to identify a first relationship between a data partition condition and a database partition; establishing a second relationship between the data partition condition and a data partition key based on the data partition rule and a third relationship between the database partition and the data partition key; adding the data partition key to a data item where the data item is stored in the database based on the second relationship between the data partition condition and the data partition key; and storing the data item in the database partition based on the data partition key of the data item.

21 Claims, 7 Drawing Sheets

METHOD AND SYSTEM FOR DATABASE PARTITION

CROSS-REFERENCE TO RELATED APPLICATION

This application claims priority under 35 U.S.C. §119 from Chinese Patent Application No. 200910136968.6 filed Apr. 30, 2009, the entire contents of which are incorporated herein by reference.

BACKGROUND OF THE INVENTION

1. Field of the Invention

The present invention generally relates to a method and system for database partitioning. More particularly, this invention is related to a method and system for dynamic database partitioning.

2. Description of Related Art

In current database systems, when a user's application data is loaded, data within a database will become extremely huge as the user's business grows. For example, a table which contains invoice records over ten years records can include a few million of lines of data. Querying such a huge table is very time-consuming.

In order to improve the speed and efficiency of database queries, database partitioning technology emerged. In particular, the database in a non-shared environment is broken down into separate partitions, and each partition has its own resources. Data is distributed to different partitions through Hash algorithms, and each partition is only responsible for dealing with their own data. When a user issues a database query, certain partitions can be used to process the request. The main purpose of the database partition is to improve the data-parallel processing performance, and to reduce the amount of data read/writes in specific database query operations in order to reduce the response time.

Database partitions can be a physical partition or a logical partition. Physical partitions refer to a partition deployed on a single physical machine, while logical partitions are partitions deployed on multi-processing system (Symmetric Multi Processing, referred to as SMP) machines. The database can be implemented on either a physical partition or a logical partition. If a large SMP machine is used, the database will usually adopt a logical partition; if more than one physical machine is used, the database will usually adopt physical partitions through a non-shared architecture; if multiple SMP machines are used, the database can adopt both physical and logical partitions.

Database partitioning technology has two advantages. First is the increased database performance. Continuing the above example, the invoice records which account for several millions of lines of data can be broken into ten different partitions, each containing one year's worth of records. Query time is then reduced to only one-tenth of that for a full table scan.

Second is the simplified data management. Partitioning technology can leverage the extensive experience of database administrators to enhance data management capabilities. Through the use of partitions, the administrator can simplify the implementation of specific data.

However, if a database has already been partitioned (either by a database vendor or by a developer), the administrator can not further modify the partition rules in subsequent database operations. Initialized partition methods normally only support partitions based on a hash table. This partitioning scheme has nothing to do with the application data. For example, the database can not partition by year in above example, which makes the database lack partition flexibility.

To make up for this deficiency, many database users write application code in order to achieve database partition when initializing partitions in the database. However, it is very difficult to achieve flexible data partitioning by writing application code because they normally require help from application developers. However, transaction based applications are becoming more and more popular. For most database applications, the administrator can not design a proper partitioning scheme before the database has been extensively used. As a result, with the continuous growth of business and the increasing amount of data, the database response time will rise over time, which can lead to an unacceptable user experience. In practice, the recent data query rates can be far higher than the historical data query rate. Partition rules set by the database administrator at very beginning need to be changed over time. For example, the dividing year needs to be changed from 2009 to 2010 one year later, which means data before and after 2010 should be recorded in two different partitions.

Therefore, although the prior art provides database partitioning, it can not achieve flexible data partitioning without modifying the current application code.

SUMMARY OF THE INVENTION

In order to address problems in prior arts, the present invention provides a flexible, dynamic database partition method and system. By adding a partition key into a data item of the database, the present invention can store database item(s) in certain partitions according to any provided partition rule. Therefore, the present invention provides a database partition solution which can be easily updated and customized. By using this invention, users of database can dynamically partition or re-partition the data stored in a database. Then the database user can achieve flexible data management with lower costs, and increase the speed and effectiveness of database queries. The present invention is not limited to any specific partitioning method such as logical or physical partitions. In fact, the present invention is applicable to either a logical partitioned or physical partitioned database.

According to an aspect of the present invention, a computer implemented method of partitioning data stored in a database is provided. The method includes the steps of acquiring a data partition rule, where the data partition rule is used to identify a first relationship between a data partition condition and a database partition; establishing a second relationship between the data partition condition and a data partition key based on the data partition rule and a third relationship between the database partition and the data partition key; adding the data partition key to a data item where the data item is stored in the database based on the second relationship between the data partition condition and the data partition key; and storing the data item in the database partition based on the data partition key of the data item.

According to another aspect of the present invention, a computer implemented method of querying a database when a data query request matches with a database partition is provided. The method includes the steps of acquiring the data query request; parsing the data query request; determining a data partition key which corresponds to the data query request; modifying the data query request to include the data partition key; and sending the processed data query request to the database.

According to another aspect of the present invention, a system for partitioning data stored in a database is provided.

The system includes means for acquiring a data partition rule, where the data partition rule is used to identify a first relationship between a data partition condition and a database partition; means for establishing a second relationship between the data partition condition and a data partition key based on the data partition rule and a third relationship between the database partition and the data partition key; means for adding the data partition key to a data item where the data item is stored in the database according to the second relationship between the data partition condition and the data partition key; and means for storing the data item in the database partition according to the data partition key of the data item.

According to another aspect of the present invention, a database query system is provided. The system includes means for acquiring a data query request; means for parsing the data query request; means for determining whether the data query request matches with a partition; means for looking for a data partition key corresponding to the data query request if the data query request matches with the partition; means for processing the data query request to add the data partition key to the data query request; and means for sending the processed data query request to the database.

The advantages of present invention are generally illustrated in above description. For a more complete understanding of these and other advantages, a detailed description is made as following with reference to the accompanying drawings.

BRIEF DESCRIPTION OF THE DRAWINGS

It is to be noted that the appended drawings illustrate only typical embodiments of this invention and are therefore not to be considered limiting to its scope.

DETAILED DESCRIPTION OF THE PREFERRED EMBODIMENTS

In the following discussion, numerous specific details are set forth to provide a thorough understanding of the present invention. It should be further noted that any particular nomenclature that follows is used merely for convenience, and thus the invention should not be limited to use solely in any specific application identified and/or implied by such nomenclature.

Unless indicated otherwise, all functions described herein can be performed in either hardware or software, or some combination thereof. In a preferred embodiment, the function is performed by a processor such as a computer or an electronic data processor in accordance with code such as computer program code, or integrated circuits that are coded to perform such function. In general, the routines executed to implement the embodiments of the invention, can be part of an operation or a specific application, component, program, module, object or sequence of instructions. The software of the present invention typically includes a multitude of instructions that will be translated by the native computer into a machine-readable format and hence executable instructions. Also programs include variables and data structures that either reside locally to the program or are found in memory or on storage devices. In addition, various programs described hereinafter can be identified based upon the application for which they are implemented in a specific embodiment of the invention. Such signal-bearing media, when carrying computer-readable instructions that direct the functions of the present invention, represent embodiments of the present invention.

Figure 1:
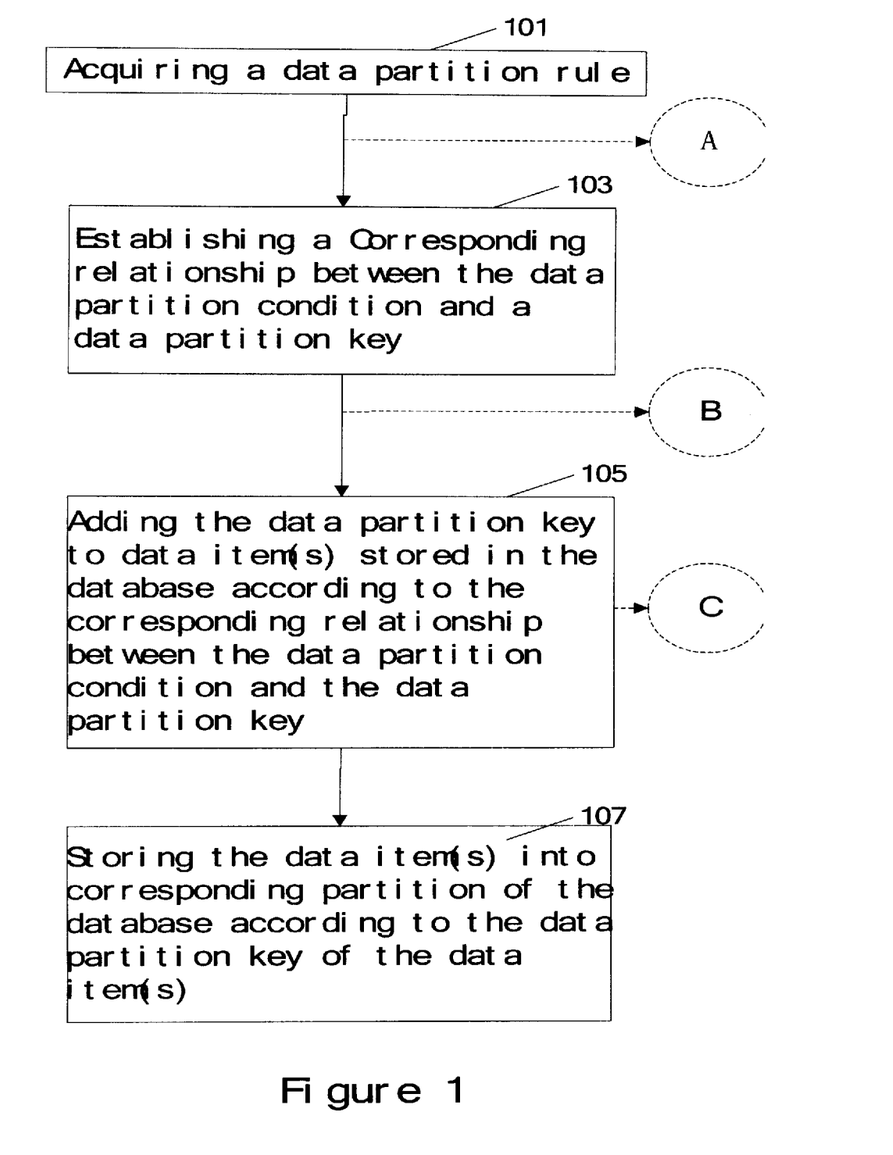
FIG. 1 is a flow chart for partitioning data in a database.

FIG. 1 is a flow chart for partitioning data in a database. Data partitioning rules, which indicate the relationship between the data partition condition and data partition, are obtained in step 101. According to one embodiment of this invention, the data partition rules are defined based on data query frequency in the database. For example, the frequently queried data is put into the same data partition, while the data that is not frequently queried will be put into other partitions. Data partition rules can be defined by a database application system administrator based on their experience and understanding of the data query, and can also be defined based on certain feedback mechanisms (the feedback mechanism will be carried out later in a more detailed description).

For example, as shown in table 1 below, assuming a database application only stores a table with the name of Sales_order, which reflects the product sales status. The column values of the table include: Id, Custermer_id, Product, Year, and Status, where the Status includes three kinds of statuses: running, finished, and canceled.

TABLE 1

| Id | Custermer_id | Product | Year | Status |
|---|---|---|---|---|
| 1 | 999 | milk | 2009 | Running |
| 2 | 888 | candy | 2008 | Running |
| 3 | 777 | flour | 2006 | Finished |
| 4 | 666 | dish | 2007 | Canceled |
| ... | ... | ... | ... | ... |

A system administrator usually has some experience with the data query status in the database. For example, he knows the most frequently requested information is the data after 2009 or data with a Status value of "Running." However, the system administrator can not define the most appropriate data partitioning rules without a log of database querying.

According to one embodiment of this invention, the system administrator can divide the database into three partitions: P0, P1 and P2. The system administrator manage the three partitions (not shown in the figure) in several ways: create new partitions when loading new data; and update existing partitions by modifying the existing data partition rules instead of modifying the existing partitions, to re-allocate data in the database according to the new data partition rules.

In Table 2, the system administrator wants to form partition rules by relating the relevant partition conditions to specific partitions. Be noted that the present invention does not attempt to protect any particular partition strategy, because these strategies depends entirely on the characteristics of the database application itself. The strategy is illustrated only for the purpose of describing application scenario of the present invention.

TABLE 2

| Partition Rules | Partition Conditions | Partitions |
|---|---|---|
| R1 | Year<2009 and Status=finished | P0 |
| R2 | Year<2009 and Status=canceled | P1 |
| R3 | Year<2009 and Status=running | P2 |
| R4 | Year>=2009 | P2 |

In FIG. 1, the letter A indicates that the optional step of acquiring a data partition key corresponding to each partition which will be discussed later in more detail.

In step 103, the relationship between the data partition condition and the data partition key based on the data partition rule and the relationship between the database partition and the data partition key is established. The relationship between the data partition condition and the data partition key can be recorded in a match table. It is well-known to the person skilled in the art that for a database supporting partitioning, each partition corresponds to at least one data partition key. The data partition key can flexibly manage the data stored in certain partition. In this step, the data partition key is used to identify which partitions correspond with which data partition rules. The process of acquiring data partition key will be discussed later in more detail. In an embodiment of this invention P0 corresponds PK of 3690, P1 corresponds to PK of 3712, P2 corresponds to PK of 2730.

Table 3 shows a match table which contains the relationships between data partition conditions and data partition keys. In particular, Table 3 can be implemented as in Table 3-1 or Table 3-2, wherein Table 3-1 indicates each parameter by a range, while Table 3-2 indicates each parameter by a more detailed manner. According to one embodiment of this invention, a PK only corresponds to one partition. But it is understood by the person skilled in the art that, in practice there can be multiple PK corresponding to one partition.

TABLE 3-1

| SQL Pattern | Parameter 1 (Year) | Parameter 2 (Status) | PK |
|---|---|---|---|
| Year<2009 and Status=Finished | <2009 | Finished | 3690 |
| Year<2009 and Status=Canceled | <2009 | Canceled | 3712 |
| Year<2009 and Status=Running | <2009 | Running | 2730 |
| Year>=2009 | >=2009 | | 2730 |

TABLE 3-2

| SQL Pattern | Parameter 1 (Year) | Parameter 2 (Status) | PK |
|---|---|---|---|
| Year < 2009 and Status = Finished | 2008 | Finished | 3690 |
| Year < 2009 and Status = Finished | 2007 | Finished | 3690 |
| ... | ... | ... | ... |
| Year < 2009 and Status = Canceled | 2008 | Canceled | 3712 |
| Year < 2009 and Status = Canceled | 2007 | Canceled | 3712 |
| ... | ... | ... | ... |
| Year < 2009 and Status = Running | 2008 | Running | 2730 |
| Year < 2009 and Status = Running | 2007 | Running | 2730 |
| ... | ... | ... | ... |
| Year > = 2009 | 2009 | | 2730 |
| ... | ... | ... | ... |

Back to FIG. 1, the letter B illustrates an optional process of processing data items in the database, which will be described later in more detail.

Next, in step 105, the data partition key is added to data items in the database based on the relationship between the data partition condition and the data partition key. The data partition key can be added through a new column in the database. Table 4 shows a table wherein the partition key is added.

TABLE 4

| Id | Custermer_id | Product | Year | Status | PK |
|---|---|---|---|---|---|
| 1 | 999 | milk | 2009 | Running | 2730 |
| 2 | 888 | candy | 2008 | Running | 2730 |
| 3 | 777 | flour | 2006 | Finished | 3690 |
| 4 | 666 | dish | 2007 | Canceled | 3712 |
| ... | ... | ... | ... | ... | ... |

In FIG. 1, the letter of C corresponding to step 105 illustrates the specific step of adding data partition key will be described later in more detail. In step 107, the data item is stored into a partition of the database based on the data partition key of the data item. For example, the data item, whose Id is 1 in Table 4, will be stored in partition P2 due to the partition key 2730 being added. Similarly, the data item, whose Id is 2, will be stored in partition P2, the data item, whose Id is 3, will be stored in partition P0, and the data item, whose Id is 4, will be stored in partition P1, etc. Finally all the items will be moved to the specified partition.

When a new data is put into the database, PK will be added according to the step showed in step 105. Therefore the new data will be located in a specified partition. Although above describes data migration of existing data, it can be understood by the person skilled in the art that the same method can be applied for a new data that needs to be loaded according to the data partition rules.

Figure 2:
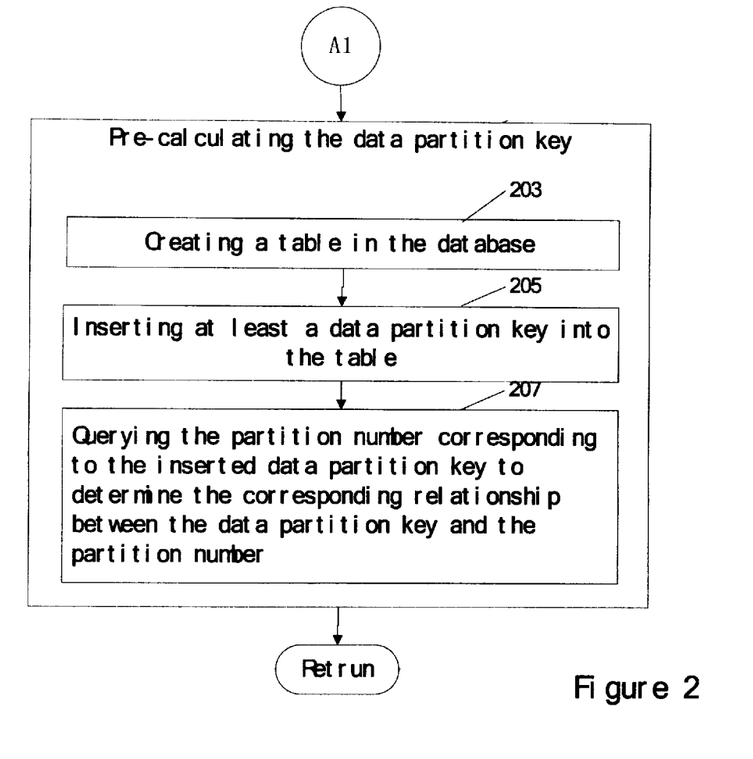
FIG. 2 is a flow chart for pre-calculating the data partition key which corresponds to a database partition for a database that supports data partitioning.

FIG. 2 is a flow chart for pre-calculating the data partition key corresponding to a partition for a database that supports data partitioning. Database partition technology in the prior art normally scatters data uniformly among different partitions using a Hash algorithm, where each partition is only responsible for processing its own data. Since the Hash algorithm is not disclosed publicly, database users have no way of knowing which data partition key is associated to which partition. For example, a user does not know which data partition key can help to allocate data into P0. Therefore, pre-calculation of which partition key corresponds to which partition is required.

Specifically, in step 203, a table is created in the database. The table is an empty table, where the data partition key is stored in a column. The following command language can be used to create an empty table:

Create table table1 (col1 BIGINT) DISTRIBUTE BY HASH (col1)

The command language is used to create an empty table table1, which has a column called col1, and col1 is used for storing integer data.

In step 205, a data partition key is inserted into the table. The partition key can be a random number, for example any integer number between 1000-9999, like 3690. The purpose of inserting a random number into an empty table is to test the corresponding partition of the random number. The following is sample command language for inserting data partition key into an empty table:

Insert into table 1 values(3690);
Insert into table 1 values(3712);
Insert into table 1 values(2730)

In step 207, the database is queried for partition numbers which correspond to the data partition key (3690, 3712, 2730). Specifically, this step is achieved through querying which partition will be allocated for a record containing certain data partition key (for example, a random). Therefore the relationship between the data partition key and the partition numbers can be determined. This step can be achieved through following command.

Select col1, dbpartitionnum(col1) from table1 where col1=2730

The above command language is used to return the specific partition number corresponding to data partition key 2730 in table1. Similarly, this step can be achieved through inputting all the data partition keys and querying the database for all the corresponding partition numbers. The following is sample command language which will return all partition numbers which correspond to all the data partition keys in table 1:

Select col1, dbpartitionnum(col1) from table1

According to above embodiment, partition number 0 is returned after partition key 3690 is inserted, partition number 1 is returned after partition key 3712 is inserted, partition number 2 is returned after partition key 2730 is inserted. When a random number is inserted, one is not sure which partition number will be returned. In other words, it is possible that the same partition number will be returned in response to various random numbers being inserted.

According to one embodiment of this invention, steps 205 and 207 need to be repeated until each partition has at least one corresponding partition key (not shown in the Figure). Therefore, the match table between partition and data partition key is established in Table 5 below (not shown in the Figure):

TABLE 5

| Partition Number | Partition Key |
|---|---|
| 0 | 3690 |
| 1 | 3712 |
| 2 | 2730 |

It should be noted that the method shown in FIG. 2 can find multiple partition keys corresponding to the same partition number. For example partition key 4623 can also correspond to partition number 0. According to one embodiment of this invention, only one partition key corresponding to a partition number is required.

Figure 3:
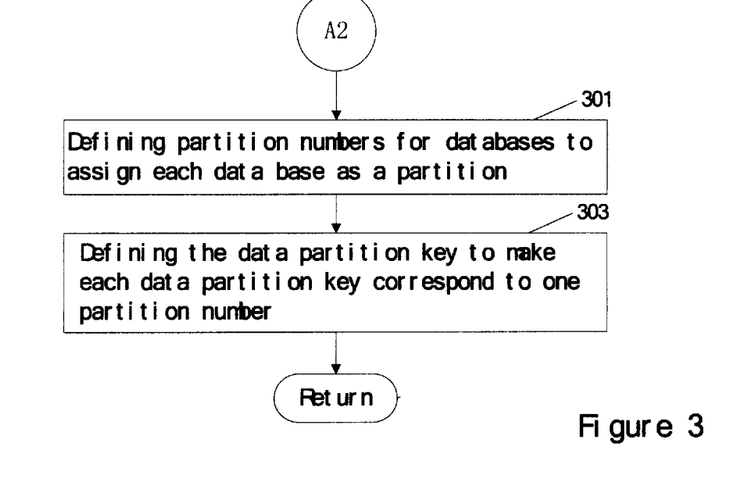
FIG. 3 is a flow chart for defining data partition key for a database that does not support data partitioning.

FIG. 3 illustrates a flow chart for defining data partition key for a database that does not support data partitioning. Currently, most large database products support partitioning, for example DB2, Oracle, and MySQL (since version 5.1). However, there are some database products that do not support partitioning. In addition, these database products do not support partition management based on data partition keys. However, it is possible to achieve the data partitioning functionality of this invention on a database that does not support data partition. In step 301, multiple partition numbers are defined for multiple partitions, so that one database is deemed as one partition. In step 303, the data partition key is defined to make each data partition key correspond to one partition number. A match table indicating the relationship between partition number and partition key is established as shown in Table 6 below. In one simple example, a partition number is the same as partition key.

TABLE 6

| Partition number | Partition Key |
|---|---|
| 0 | 0 |
| 1 | 1 |
| 2 | 2 |

The technical resolutions provided by FIG. 2 or 3 are processed after step 101 "acquiring data partition rule" in FIG. 1. It is understood by the person skilled in the art that, the matching relationship between the partition and the data partition key can be established at any time prior to establishing the relationship between data partition rule and data partition key, and does not have to occur right after the "acquiring data partition rule" step.

Figure 4:
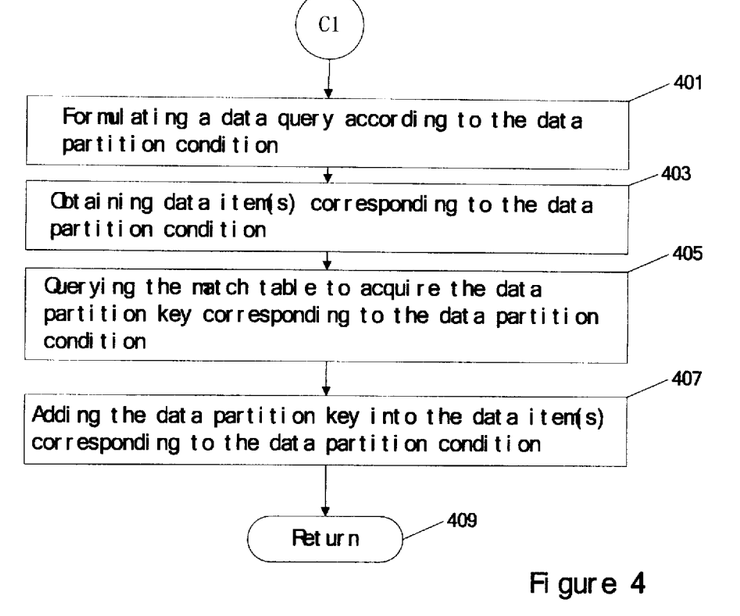
FIG. 4 is a flow chart for adding partition keys in a batch.

FIG. 4 is a flow chart for adding partition keys in a batch. In step 401, a data query is formulated according to the data partition condition. For example, data items that comply with the partition condition of "Year<2009 and Status=finished" are retrieved based on data partition rule R1. In step 403, data items corresponding to the data partition condition are obtained. In step 405, the match table (Table 3) is queried to acquire the data partition key (such as partition key 3690 corresponding to R1) that corresponds to the data partition condition. In step 407, the data partition key is unitarily added into the data items. Table 7 below shows the data items table in which data partition keys have been added. Step 409, returns the process back to the step 105 in FIG. 1.

| Id | Custermer_id | Product | Year | Status | PK |
|---|---|---|---|---|---|
| Table 7-1 data item(s) table in partition P0 | | | | | |
| 3 | 777 | flour | 2006 | Finished | 3690 |
| ... | ... | ... | ... | ... | ... |
| Table 7-2 data item(s) table in partition P1 | | | | | |
| 4 | 666 | dish | 2007 | Canceled | 3712 |
| ... | ... | ... | ... | ... | ... |
| Table 7-3 data item(s) table in partition P2 | | | | | |
| 1 | 999 | milk | 2009 | Running | 2730 |
| 2 | 888 | candy | 2008 | Running | 2730 |
| ... | ... | ... | ... | ... | ... |

Figure 5:
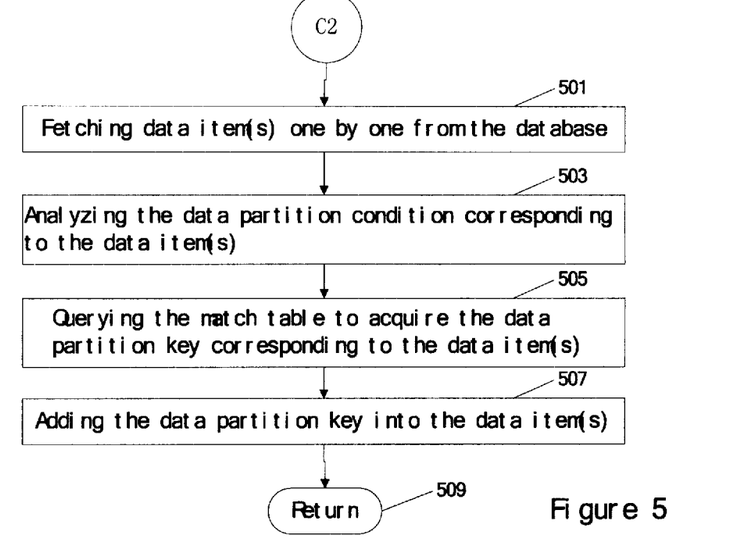
FIG. 5 is a flow chart for adding partition keys one by one.

FIG. 5 is a flow chart for another embodiment of the present invention which is adding partition keys one by one. Step 501 retrieves data items one by one from the database. In step 503, the data partition conditions which correspond to the data items are analyzed. In step 505, the match table is queried to acquire the data partition key which corresponds to the data items. In step 507, the data partition key is added into the data items, so that data item tables in Table 7 are formed. In step 509, is the process returns to the step 105 of FIG. 1.

Cache is high-speed, small-capacity temporary memory, which can be achieved through a high-speed static memory chip, or integrated into the CPU chip. Cache is used for storing the most frequently accessed instructions or operational data. The content of cache can be frequently changed due to hit rate reduction. According to one embodiment of the present invention, the cache can be used to store the match table to improve subsequent data querying speed.

The data structure of column value of the data items in the database can be the same as that of the data partition conditions. Therefore parameters in the match table can be directly used to determine whether a data item complies with any of the data partition rules. However, the data structure of column value of the data items in the database can not always be the same as that of the data partition condition. In a simple example, one parameter in the data partition condition is year, such as "2002", while in the actual data item table, more detailed information about date can be stored as column value, such as "2002.10.1". The column value of data item in the database is inconsistent with that of data partition condition. Therefore there is a need to further process the data items.

Figure 6:
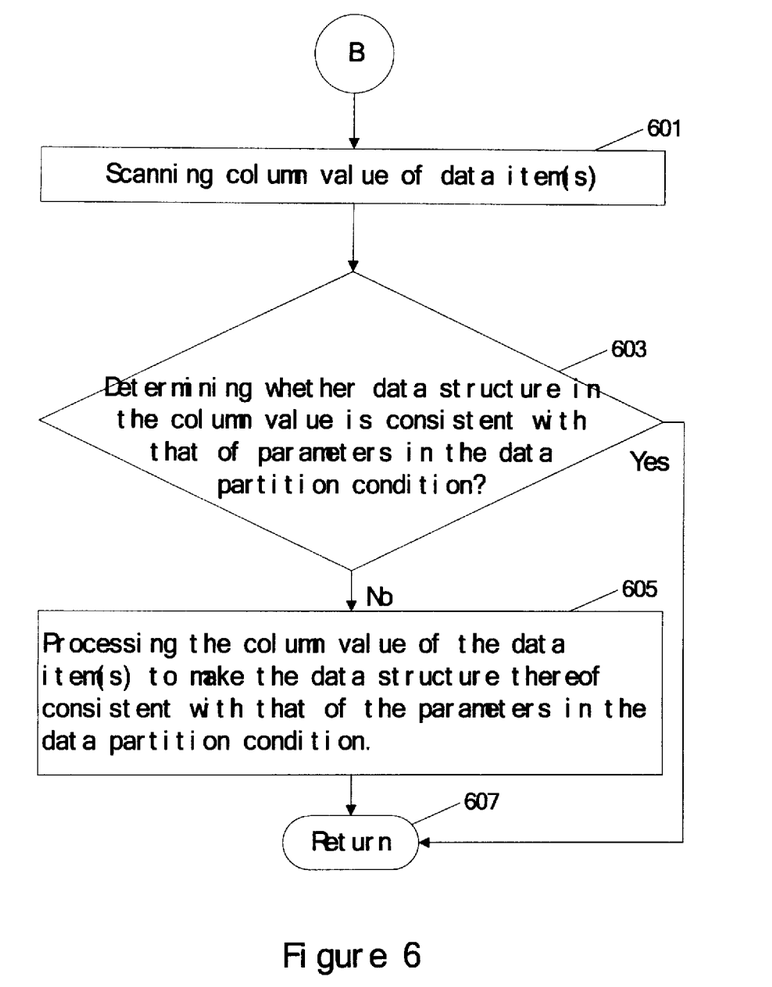
FIG. 6 is a flow chart for processing data items in database.

FIG. 6 is a flow chart for processing data item(s) in database. Step 601 scans the column value of the data items. Step 603, determines whether the data structure in the column value is consistent with that of parameters in the data partition condition. If the data structures are the same, is the process is returned in step 607. If the data structures are different, the column value of the data items need to be processed, at step 605, to make the data structure consistent with the parameters in the data partition condition. For example, "2002.10.1" is processed to indicate the Year value of "2002". The process is returned in step 607. The value of Year identified by the processed data items can be directly used in subsequent steps to determine which partition key should be added to which data items.

Figure 7:
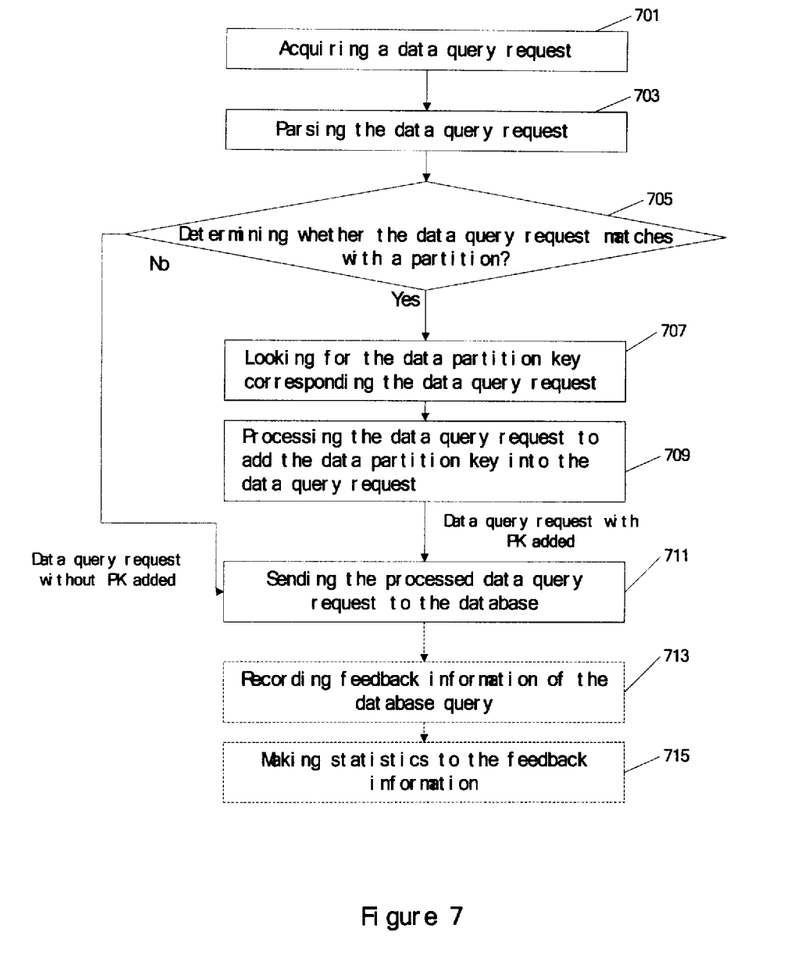
FIG. 7 is a flow chart for database query based on dynamic database partitioning technology.

FIG. 7 is a flow chart for processing a database query based on dynamic database partition technology. In step 701, a data query request is acquired. The following is a sample data query request:

Select * from Sales_order where Year=2005 and Status='Finished'

Data Query Request 1

In step 703, the data query request is parsed. The process of parsing is used to determine the column value of data query request. For example, the column value of Data Query Request 1 is Year=2005 and Status='Finished'. Step 705, determines whether the data query request matches with a partition, which means the data query request can be conducted by querying only one partition. Apparently, Data Query Request 1 complies with data partition rule R1, and hence is matched with only partition P0. But in practice, not all the data query requests can be matched to one partition. For example, the following Data Query Request 2 can not match with a single partition.

Select * from Sales_order where Product='telephone'

Data Query Request 2

In practice, data query requests can be matched with multiple partitions. For example, the following data query request can match both P0 and P2:

Select * from Sales_order where Year>2005 and Status='Finished'

Data Query Request 3

It is understood by the person skilled in the art that sometimes the data query request can match all the partitions in the database. This is illustrated in following data query request:

Select * from Sales_order where Year>2005

Data Query Request 4

In step 707, if a data query request matches at least one partition, the data partition key corresponding to the data query request will be searched. This step can be achieved through searching a match table as exemplified in Table 3. For example, according to the match table in Table 3, the data partition key with regards to the Data Query Request 1 should be 3690, and the data partition key with regards to the Data Query Request 3 should be 3690 and 2730.

In step 709, the data query request to add the data partition key to the data query request is processed. For example, Data Query Request 1 can be modified as follows:

Select * from Sales_order where Year=2005 and Status='Finished' and PK=3690

And the Data Query Request 3 can be modified as follows:

Select * from Sales_order where Year>2005 and Status='Finished' and PK=3690,2730

In step of 711, the processed data query request is sent to the database. If the data query request matches at least one data partition, the data query request sent to the database is the request with the data partition key added. Therefore a search will only be conducted within particular matched partition, instead of all partitions. If the data query request does not match any data partitions, the data query request sent to the database is the request without any partition keys added, which is the original query request. Therefore, a search will be conducted across all partitions of the database.

Step 713 is the optional step of recording the feedback information of the database query. The feedback information can help to determine whether the current data partition rule is reasonable or not, and recommend a reasonable data partition rule which will optimize database query performance. In practice, it is very difficult for many system administrators to determine the most ideal data partition rule at very beginning unless they have a very careful design at the very beginning. Therefore feedback information can help the system administrators correct the initial partition rule design.

Specifically, the feedback information can include at least one of following pieces of information: a data query condition in data query request, such as where Year=2005 and Status='Finished', the number of data items returned from the database according to the data query condition, the response time for returning the data items, the partition queried in practice. This feedback information can be used to determine which items are frequently queried and which are not. In step 715, statistics are made of off the feedback information. The statistics can include at least one of the following: statistics of the data queries with same data query condition, statistics of which data items are hit for each data query, statistics of the response time for returning the data items corresponding to each data query condition, statistics of queried times of each partition in practice.

Figure 8:
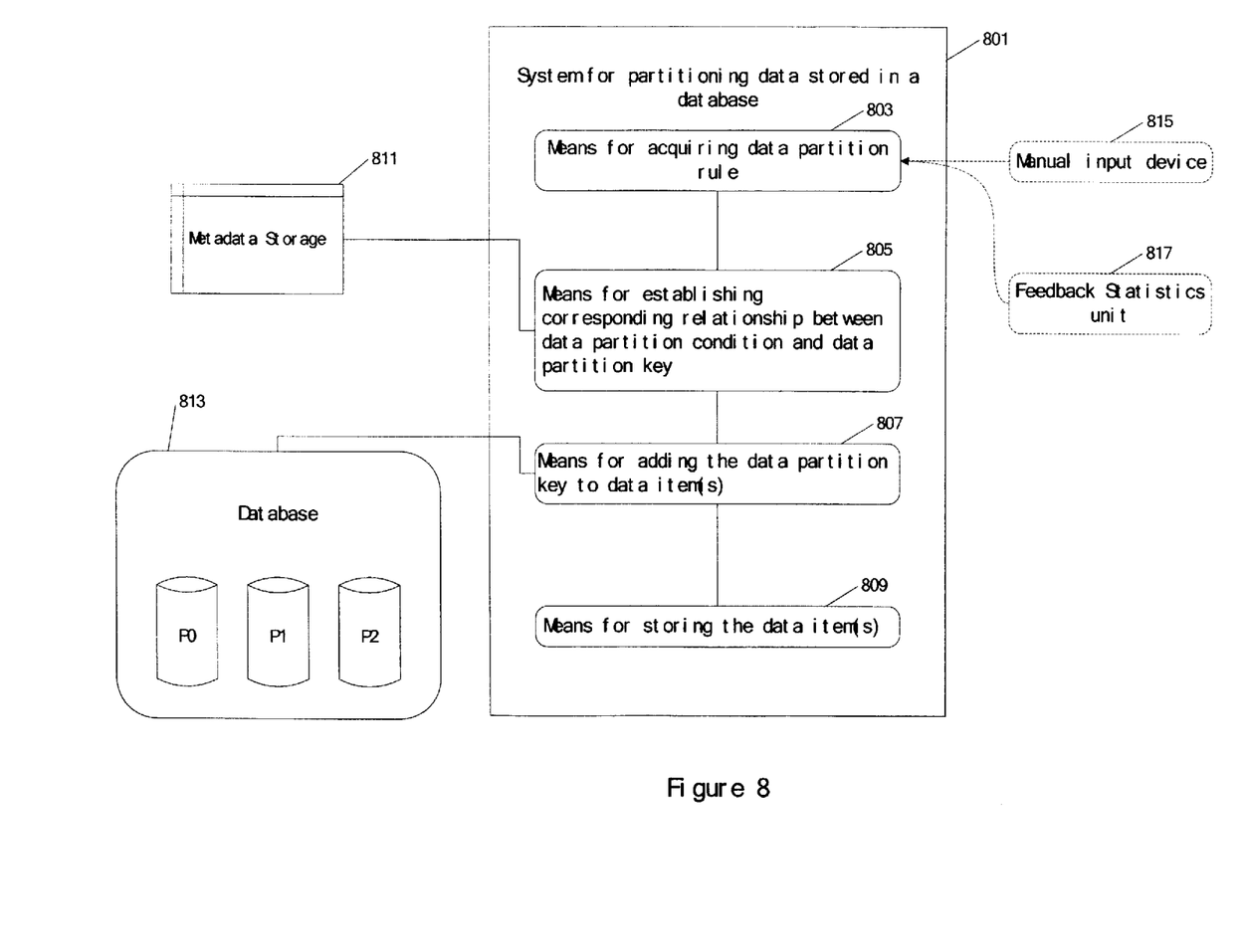
FIG. 8 is a block diagram for partitioning data of a database.

FIG. 8 is a block diagram for partitioning data in a database. The system for partitioning data stored in a database 801 includes means for acquiring data partition rule 803, means for establishing corresponding relationship between data partition condition and data partition key 805, means for adding the data partition key to data items 807, and means for storing the data items 809.

Specifically, means for acquiring data partition rule 803 is used to acquire a data partition rule, which is referred to in Table 2. Optionally, means 803 can obtain manually inputted data partition rule from a manual input device 815, or can obtain data partition rule from a feedback statistics unit 817. The feedback statistics unit 817 is used to make statistics about the feedback information of database query, and can be used to update/create data partition rule.

Means for establishing relationships between data partition conditions and data partition keys 805 is used to build relationships between the data partition conditions and data partition keys based on the data partition rule and the relationship between partitions and the data partition keys. The relationship between the data partition conditions and data partition keys will be recorded in the match table, which will be stored in the metadata storage 811. Specifically, by determining the relationships between the data partition rule and partition in the above Table 5 or Table 6, the relationships between the data partition condition and the data partition key in above Table 3 can be built. Further, the data partition key can be used to determine which partition data items complying with certain conditions need to be stored.

Means for adding the data partition key to data items 807 is used to add corresponding data partition key to the data items in the database based on the data partition rule. The data partition key can be used as a new column value to extend the table in the database. Means for storing the data items 809 is used to store the data items in a particular partition of the database 813 according to the data partition key. The data items which have had data partition key added can be referred in the above Table 7.

Optionally, partitions in the database 813 can be configured with different physical resources. Providing better physical resources for some partitions can further improve query efficiency in the partitions. According to one embodiment of present invention, historical data that is not frequently queried are stored in P0 and P1, while the recent data or data that is frequently queried is stored in P2. P2 is configured with better physical resources, such as a faster CPU, faster disk and faster memory to achieve faster I/O speed and faster processing capability which reduces query response time in P2.

Figure 9:
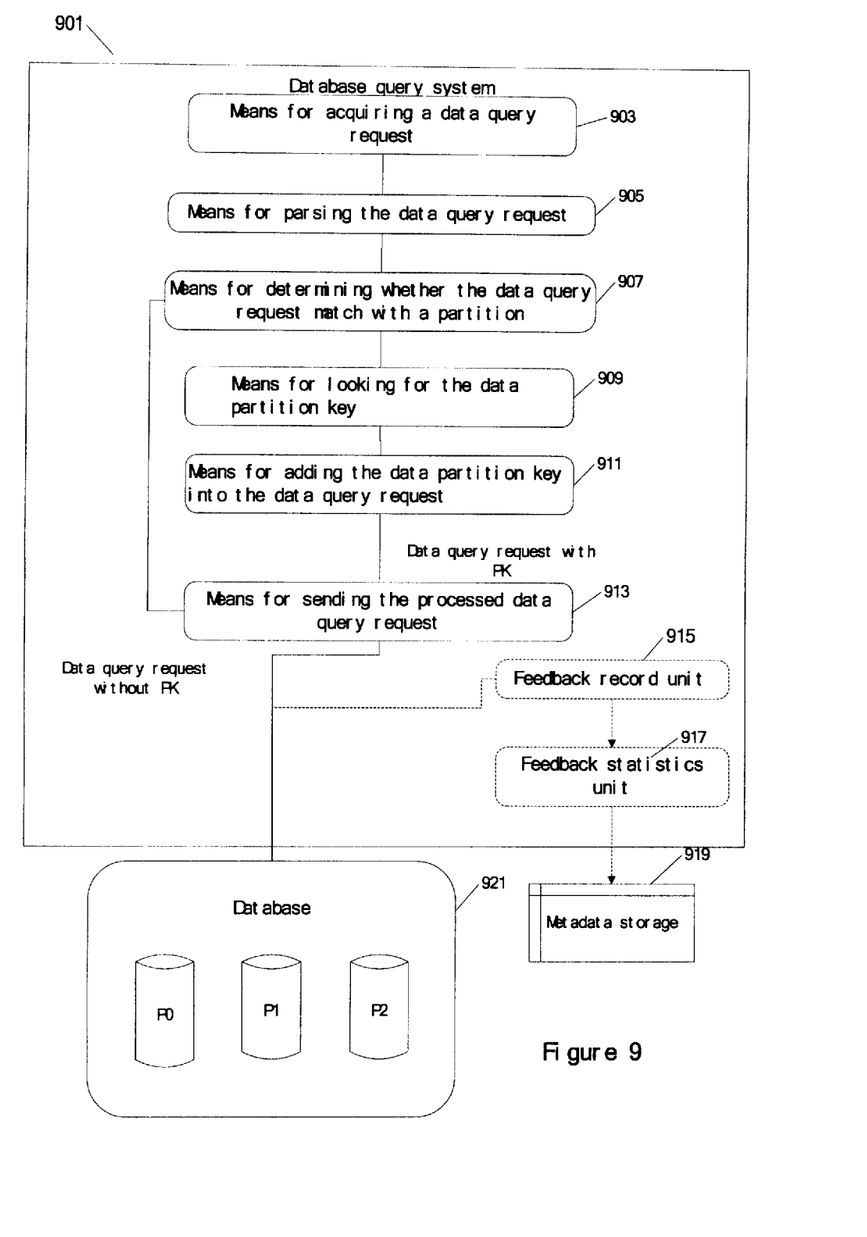
FIG. 9 is a block diagram for a database query system based on dynamic database partitioning technology.

FIG. 9 is a block diagram for database query system based on dynamic database partitioning technology. The database query system 901 includes means for acquiring a data query request 903, means for parsing the data query request 905, means for determining whether the data query request match with a partition 907, means for looking for the data partition key 909, means for adding the data partition key to the data query request 911, and means for sending the processed data query request 913. Optionally, an embodiment of the present invention further includes a feedback record unit 915 and a feedback statistics unit 917.

Specifically, means for acquiring a data query request 903 is used to acquire a data query request inputted by a user through a UI. Means for parsing the data query request 905, is used to parse the data query request to acquire its column value. Means for determining whether the data query request matches with a partition 907 is used to determine whether the data query request can match with at least one partition based on the parsed column value of the data query request and the data partition rule.

In another words, means 907 is used to determine whether the query can be finished by searching at least one partition instead of all partitions. Means for looking for the data partition key 909 is used to look for a data partition key corresponding to the data query request if the determining means 907 determines that the data query request matches at least one partition. Specifically, the looking means 909 can obtain corresponding data partition key through the match table exemplified in Table 3 stored in the metadata storage 919.

Means for adding the data partition key to the data query request 911 is used to add the data partition key to the data query request. Means for sending the processed data query request 913 is used to send data query request to the database 921. In the event that the data query request matches at least one partition, the sending means 913 is used to send the data query request with data partition key added to the data query request, so that the search is conducted within certain matching partitions, instead of all the partitions. In the event that data query request does not match any partition, the sending means 913 will send a data query request to the database without data partition key added to data query request, in another words, the original query request. Therefore, the search will be conducted within all the partitions of the entire database. Feedback record unit 915 is used to record feedback information of the database query. Feedback statistics unit 917 is used to make statistics for the feedback information.

Furthermore, each of the above operations can be implemented by executing program code stored a computer program product. The program product defines functions of each embodiment and contains a variety of signals, including, but not limited to: (i) information permanently stored on non-writable storage media; (ii) information stored on writable storage media; or (iii) information conveyed to a computer by a communications medium, such as through a computer or telephone network, including wireless communications. The latter embodiment specifically includes information downloaded from the Internet and other networks.

Embodiments in the present invention provide many advantages, including those that are already illustrated in this specification, and those that can be generalized from the technical solutions. No matter whether an embodiment can realize all advantages or not, and no matter what substantial improvement is achieved as a result of these advantages, no limitation shall be made to the present invention. While the foregoing is directed to specific embodiments of the present invention for the purpose of illustration, other and further embodiments of the invention can be readily devised by one person skilled in the art without departing from the basic scope of the invention which is defined by the claims.

The invention claimed is:

1. A computer implemented method utilizing at least one computer processor for partitioning data stored in a database, the method comprising:
  acquiring at least one data partition rule from a set of data partition rules stored in the database, wherein
    the set of data partition rules includes at least one rule defined based on at least one of
      data query frequency in the database, and
      feedback information comprising statistical information associated with data queries performed on the database,
    each rule of the set of data partition rules comprises at least one data partition condition for a given database partition of the database,
    the at least one data partition condition indicates at least one condition to be satisfied by data items for association with the given database partition;
  identifying, based on the data partition rule, a data partition key associated with the given database partition;
  associating, based on the identifying, the data partition key with the at least one data partition condition;
  determining that at least one data item stored in the database satisfies the at least one condition of the at last one data partition condition;
  adding, based on the determining, the data partition key associated with the at least one data partition condition to the data item, wherein the adding comprises adding a column comprising the data partition key to at least one data item table in the database comprising the data item; and
  storing, based on the adding, the data item in the given database partition according to the data partition key of the data item.

2. The method according to claim 1, wherein the associating comprises:
  recording the at least one data partition condition and the data partition key associated therewith into a match table.

3. The method according to claim 2, wherein the adding comprises:
  executing a data query, wherein the data query is based on the at least one data partition condition;

obtaining the data item from a result of the executing the data query;
querying the match table to acquire the data partition key associated with the at least one data partition condition; and
adding the data partition key to the data item.

4. The method according to claim 2, wherein the adding comprises:
retrieving the data item from the database;
retrieving the at least one data partition condition based on a set of parameters associated with the data item;
querying the match table to acquire the data partition key associated with the at least one data partition condition; and
adding the data partition key to the data item.

5. The method according to claim 2, wherein the match table is stored in a cache.

6. The method according to claim 1, further comprising:
pre-calculating the data partition key.

7. The method according to claim 6, wherein the pre-calculating comprises:
creating a given table in the database;
inserting the data partition key into the given table; and
querying the database for a partition number which corresponds to the data partition key.

8. The method according to claim 1, further comprising:
assigning a partition number to the given database partition; and
relating the data partition key to the partition number.

9. The method according to claim 1, wherein the method further comprises:
acquiring a new data item from the database;
adding a given data partition key to the new data item according to a data partition condition comprising one or more conditions satisfied by the new data item; and
storing, based on the given data partition key added to the new data item, the new data item in a partition of the database corresponding to the given data partition key added to the new data item.

10. A non-transitory computer readable article of manufacture tangibly embodying computer readable instructions which, when executed, cause a computer device to implement a method of partitioning data stored in a database, the method comprising:
acquiring at least one data partition rule from a set of data partition rules stored in the database, wherein
each rule of the set of data partition rules comprises at least one data partition condition for a given database partition of a database,
the at least one data partition condition indicates at least one condition to be satisfied by data items for association with the given database partition;
pre-calculating a set of data partition keys, wherein the pre-calculating comprises:
creating a given table in the database, wherein the given table is initially empty;
selecting a set of random data partition keys;
inserting each key of the set of random data partition keys into the given table that is empty;
querying, for each key of the set of random data partition keys inserted into the given table, the database for a partition number which corresponds to the inserted data partition key, wherein the querying at least sends one or more queries to the database comprising at least one key of the set of random data partition keys inserted into the table;
receiving, based on the querying, the partition number for each of the set of random data partition keys inserted into the table; and
storing each number of the partition numbers and each key of the set of random data partition keys in a match table, wherein the match table is separate and distinct from a given database partition associated with the partition numbers and the set of random data partition keys;
identifying, based on the at least one data partition rule and the match table, a data partition key associated with the given database partition;
associating, based on the identifying, the data partition key with the at least one data partition condition;
determining that at least one data item stored in the database satisfies the at least condition of the at least one data partition condition;
adding, based on the determining, the data partition key associated with the at least one data partition condition to the at least one data item; and
storing, based on the adding, the at least one data item in the given database partition according to the data partition key of the at least one data item.

11. A computer implemented method utilizing at least one computer processor for querying a database, the method comprising:
acquiring a data query request;
parsing the data query request;
identifying, based on the parsing, at least one column value of the data query request;
comparing the column value to a set of data partition rules stored in the database, wherein
each rule of the set of data partition rules comprises at least one data partition condition for a given database partition of the database,
the data partition condition indicates at least one condition to be satisfied by data items for association with the given database partition, and
each rule of the set of data partition rules further comprises an identifier of the given database partition and is separate and distinct from the given database partition;
determining, based on the comparing, that the column value satisfies the at least one data partition condition of at least one data partition rule in the set of data partition rules;
identifying, based on the determining, a data partition key from the at least one data partition rule comprising the at least one data partition condition that has been satisfied;
modifying, prior to processing the data query request against the database, the data query request to include the data partition key, the modifying comprising adding at least one predicate to the data query request comprising the data partition key; and
sending the data query request comprising the data partition key to the database.

12. The method according to claim 11, further comprising:
recording feedback information of the data query request, wherein the feedback information comprising one of:
a data query condition in the data query request,
a number of data items returned from the database according to the data query condition,
a response time for returning the data item, and
a partition queried.

13. An information processing system for partitioning data stored in a database, the information processing system comprising:

a processor implemented at least partially by hardware;
a memory communicatively coupled to the processor; and
a data partitioning system communicatively coupled to the processor and the memory, wherein the data partitioning system is configured to perform a method comprising:
   acquiring at least one data partition rule from a set of data partition rules stored in the database, wherein
      the set of data partition rules includes at least one rule defined based on at least one of
         data query frequency in the database, and
         feedback information comprising statistical information associated with data queries performed on the database,
      each rule of the set of data partition rules comprises at least one data partition condition for a given database partition of the database,
      the at least one data partition condition indicates at least one condition to be satisfied by data items for association with the given database partition;
   identifying, based on the data partition rule, a data partition key associated with the given database partition;
   associating, based on the identifying, the data partition key with the at least one data partition condition;
   determining that at least one data item stored in the database satisfies the at least one condition of the at last one data partition condition;
   adding, based on the determining, the data partition key associated with the at least one data partition condition to the data item, wherein the adding comprises adding a column comprising the data partition key to at least one data item table in the database comprising the data item; and
   storing, based on the adding, the data item in the given database partition according to the data partition key of the data item.

14. The information processing system according to claim 13, wherein the method further comprises:
   recording the at least one data partition condition and the data partition key associated therewith into a match table.

15. The information processing system according to claim 14, wherein the adding comprises:
   executing a data query, wherein the data query is based on the at least one data partition condition;
   obtaining the data item from a result of the executing the data query;
   querying the match table to acquire the data partition key associated with the at least one data partition condition; and
   adding the data partition key to the data item.

16. The information processing system according to claim 14, wherein the adding comprises:
   retrieving the data item from the database;
   retrieving the at least one data partition condition based on a set of parameters associated with the data item;
   querying the match table to acquire the data partition key associated with the at least one data partition condition; and
   adding the data partition key to the data item.

17. The information processing system according to claim 14, wherein the match table is stored in a cache.

18. The information processing system according to claim 13, wherein the method further comprises:
   pre-calculating the data partition key.

19. The information processing system according to claim 18, wherein the pre-calculating comprises:
   creating a given table in the database;
   inserting the data partition key into the given table; and
   querying the database for a partition number which corresponds to the data partition key.

20. The information processing system according to claim 13, wherein the method further comprising:
   assigning a partition number to the given database partition; and
   relating the data partition key to the partition number.

21. The information processing system according to claim 13, wherein the method further comprising:
   acquiring a new data item from the database;
   adding a given data partition key to the new data item according to a data partition condition comprising one or more conditions satisfied by the new data item; and
   storing, based on the given data partition key added to the new data item, the new data item in a partition of the database corresponding to the given data partition key added to the new data item.

* * * * *